(No Model.)
J. E. WINDLE.
POWER REVERSING MECHANISM.
No. 591,184. Patented Oct. 5, 1897.
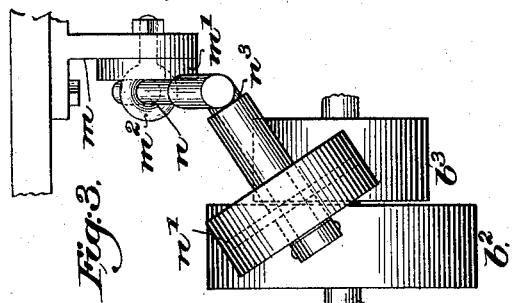
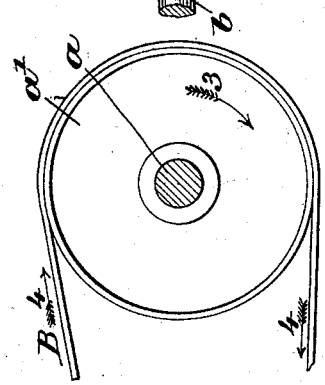
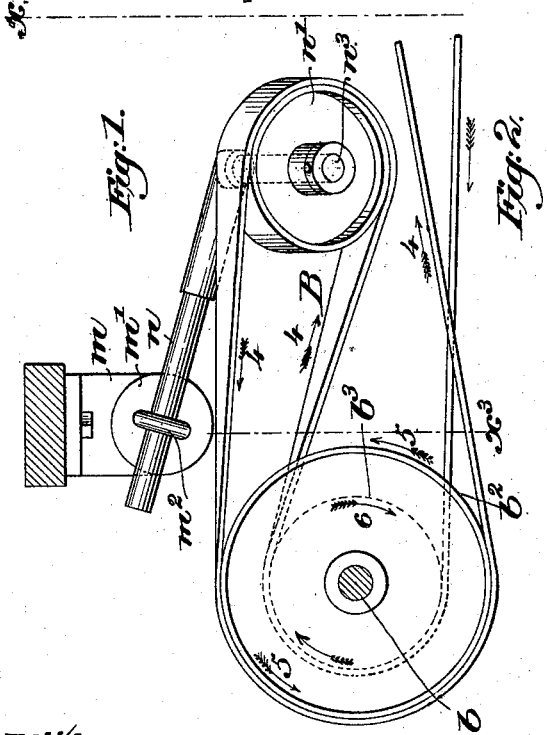
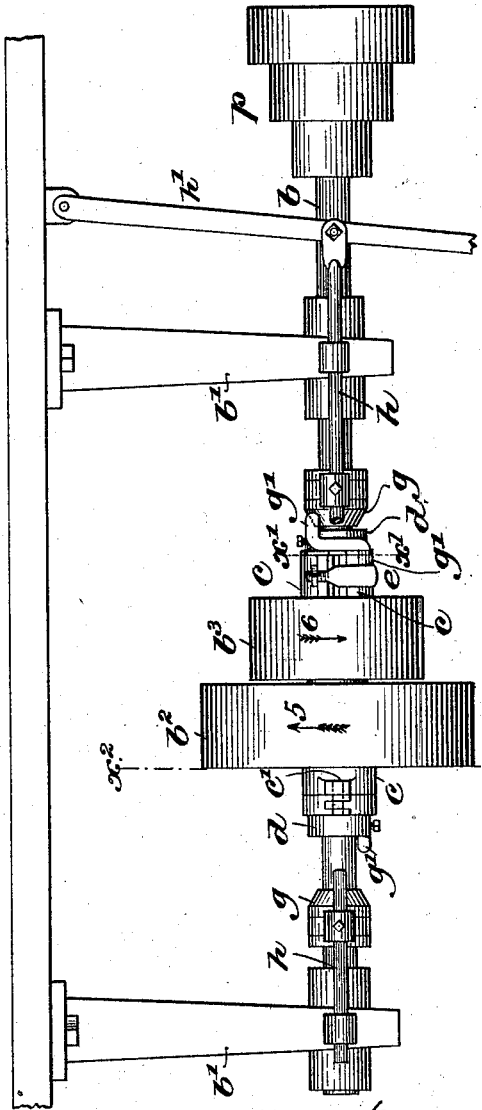
Witnesses.
A. C. Harmon
Thomas J. Drummond
Inventor.
John E. Windle
by Crosby Gregory
attys

UNITED STATES PATENT OFFICE.

JOHN E. WINDLE, OF WORCESTER, MASSACHUSETTS.

POWER-REVERSING MECHANISM.

SPECIFICATION forming part of Letters Patent No. 591,184, dated October 5, 1897.

Application filed April 18, 1894. Serial No. 508,013. (No model.)

*To all whom it may concern:*

Be it known that I, JOHN E. WINDLE, of Worcester, county of Worcester, State of Massachusetts, have invented an Improvement in Power-Reversing Mechanism, of which the following description, in connection with the accompanying drawings, is a specification, like letters on the drawings representing like parts.

In mills it is customary to employ a line or power shaft which by suitable pulleys and belts drives a number of counter-shafts, said counter-shafts having two loose pulleys, one or the other of which may be coupled to and made to drive the counter-shaft, and in order that the direction of rotation of said shaft may be controlled as desired, according to the direction it is desired to rotate a machine or other shaft, one of said loose pulleys is driven by an open belt and the other by a crossed belt. Now in practice this great number of belts moving from the main to the counter shaft is objectionable, for, besides their cost, they darken the room, and the great number of pulleys required on the main shaft in a crowded room leaves insufficient space for throwing off and on the belts, especially when the pulleys are being oiled. The more the ceiling of a factory is exposed the better the light, other things being equal. I have devised means whereby about one-half the usual quantity of length of belt may be dispensed with, one-half the number of belts and of pulleys on the main shaft being actually dispensed with. To do this, I have changed the relative positions of the usual fast and loose pulleys and have combined with these an idler, thus enabling me with one belt to drive both the loose pulleys continuously in reverse directions, and by a suitable clutch device between said loose pulleys and said shaft I am enabled to couple either of said pulleys at will to and so as to make it the driver for said shaft, it being possible with one and the same belt running continuously in the same direction to run the counter-shaft in either of two directions at will.

Figure 1, in elevation and section, represents part of a main shaft and a counter-shaft adapted to be driven therefrom in accordance with my invention, the belt being broken out to save space upon the drawings, the hangers for the shafts being omitted, the section being in the line $x^2$, Fig. 2. Fig. 2 is a side view of the counter-shaft and its hangers, looking toward the left from line $x^3$, Fig. 1, the belts being omitted. Fig. 3 is a detail looking at some of the parts in Fig. 1 from the position $x$; and Fig. 4, a section in the line $x'$, Fig. 2.

The main shaft $a$, in practice, has on it a pulley $a'$ for each counter-shaft $b$ to be driven. The counter-shaft $b$, supported in boxes or bearings carried by suitable hangers $b'$, has on it two loose pulleys $b^2$ $b^3$, said pulleys, for the best results, being arranged close together, said loose pulleys having combined with them and with said counter-shaft a suitable clutch device, I having chosen herein to illustrate as a good form of clutch device that patented to me May 16, 1893, No. 497,506.

Referring to Fig. 2, $c$ represents friction-straps surrounding the hubs of the said loose pulleys; $d$, collars fixed to said shaft, one for each pulley; $c'$, pivots for said friction-straps; $e$, links connected each to one end of said straps and loose with relation to the other end thereof, and $g'$ a rocker interposed between a projection on the link $e$ and one end of the strap $c$, and $g$ is a conical hub loose on the counter-shaft and adapted to be slid thereon to put its conical end operatively against the outer end of said rocker and cause it to tighten the strap $c$ onto the pulley-hub within it, thus clutching that pulley to the shaft and making it the driver. The clutch devices referred to are the same as in said patent and are herein designated by like letters. As herein shown, the two conical hubs $g$ are controlled by forked arms secured to one and the same rod $h$ under the control of a shipper-lever $h'$, the two hubs $g$ being separated for such distance that when one of them is operative with one of the rockers the other occupies its inoperative position, and therefore by slightly moving said rod $h$ either pulley $b^2$ or $b^3$ may be clutched to and be made the driver for the counter or other shaft surrounded by said pulleys. Near the counter-shaft I place a suitable stand $m$, attached, it may be, to the ceiling or other firm support, and, as shown, I have mounted on said stand a clamp or locking device, represented as composed of a washer $m'$ and an eyebolt $m^2$, said eyebolt receiving through it the rotatable shank of a carrier $n$ for an idler-pulley $n'$, said idler being so supported that its center of motion, a stud $n^3$, may be made to occupy a position more or less out of line with relation to the counter-shaft, according to the widths of the faces of the pulleys $b^2$ $b^3$ and the respective diameters of said pulleys. The center of motion of the idler is also adapted to be moved toward and from the counter-shaft by sliding the carrier in the eyebolt and by swinging the same thereon as a pivot to thus strain more or less tightly the belt B surrounding it. Instead of using two belts, as before stated, I employ one belt B, it being extended about the pulley $a'$, and thence one part or run of the belt is wrapped partially about the pulley $b^3$, another part or run being wrapped partially about the pulley $b^2$, the belt being then made to surround the said idler, as shown in Fig. 1. Referring to said figure, the arrow 3 shows the direction of rotation of the main pulley $a'$ and the arrow 4 the direction of the run of the belt, the arrows 5 and 6 showing the direction of rotation, respectively, of the pulleys $b^2$ and $b^3$, and it will be noticed that one and the same belt drives said pulleys constantly in opposite directions. I have shown one form of clutch to connect one of the said pulleys $b^2$ or $b^3$ at will to the shaft $b$, but this invention is not limited to the particular form of clutch mechanism shown, as instead any other usual or suitable clutch mechanism might be employed; and while I have herein shown the pulleys $a'$ $b^2$ $b^3$ and idler as having flat surfaces, yet my invention is not limited to the use of pulleys shaped peripherally, as shown, as the said pulleys may have their faces shaped to receive any usual driving belts or bands, I having met with excellent results and made great saving by using a rope instead of a leather or india-rubber belt, the faces of the pulleys and idler when a rope is employed being more or less grooved; and by the term "belt," as used in the claims, I intend to cover any driving band or rope.

It will also be understood that my invention is not limited solely to driving or reversing a counter-shaft, but is applicable to driving in one and another direction at will any shaft which may be belted to the shaft which constitutes its driver, and in the claims I shall designate the shaft heretofore called "counter-shaft" as a second shaft.

In Fig. 2 I have shown the counter-shaft as provided with a step cone-pulley $p$, so that a machine of any sort having a like step cone-pulley may be driven at a faster or slower speed, as may be desired, the direction of rotation of the machine-shaft depending, however, on the direction of rotation of the shaft $b$.

This invention is not limited to the particular shape shown for the carrier for the idler-pulley nor to the particular devices shown for supporting the said idler-pulley or for adjusting it.

It is obvious that my invention would not be departed from if shafts $a$ and $b$ were not exactly parallel.

Having described my invention, what I claim, and desire to secure by Letters Patent, is—

1. A power-reversing mechanism for a shaft, consisting of a main or driving shaft having a driving-pulley, a second shaft substantially parallel thereto, two loose pulleys surrounding said second shaft, clutch mechanism to enable either of said pulleys to be coupled at will with and to drive said second shaft, and an idler-pulley, combined with a single belt surrounding said driving-pulley and passed about said two loose pulleys on the second shaft and said idler, whereby one and the same belt may be made to drive said loose pulleys continuously in opposite directions, to thereby enable said second shaft to be rotated in either direction, substantially as described.

2. A power-reversing mechanism for a shaft, consisting of a main or driving shaft having a driving-pulley, a second shaft substantially parallel thereto, two pulleys loosely mounted on said second shaft in close alinement with each other, clutch mechanism on said second shaft to be reciprocally engaged with either one of said loose pulleys, and an idler adjacent to said loose pulleys and mounted to revolve in a plane at an acute angle to said loose pulleys, combined with a single belt surrounding said driving-pulley and passed about said two loose pulleys and said idler, whereby one and the same belt is made to drive said loose pulleys continuously in opposite directions to thereby enable said second shaft to be rotated correspondingly in either direction by the movement of said clutch mechanism into engagement with the loose pulley revolving in said direction, substantially as described.

3. A power-reversing mechanism for a shaft, consisting of a main or driving shaft having a driving-pulley and driven continuously in one direction, a second shaft substantially parallel thereto, two pulleys of different diameters loosely mounted on said second shaft in close alinement with each other, clutch mechanism on said second shaft to be reciprocally engaged with either one of said loose pulleys, and an idler adjacent to said loose pulleys and mounted to revolve in a plane at an acute angle to said loose pulleys, combined with a single belt surrounding said driving-pulley and passed about said two loose pulleys and said idler, whereby one and the same belt is made to drive said loose pulleys continuously in opposite directions to thereby enable said second shaft to be rotated correspondingly in either direction but at different speeds by the movement of said clutch mechanism into engagement with the loose pulley revolving in said direction, substantially as described.

4. A power-reversing mechanism for a shaft, consisting of a main or driving shaft having a driving-pulley, a second shaft substantially parallel thereto, two pulleys loosely mounted on the said second shaft in close proximity to each other, and clutch mechanism on said second shaft to be reciprocally engaged with either one of said loose pulleys, combined with an idler-pulley mounted for adjustment to and from said loose pulleys, and a single belt passed around said idler and said driving-pulley and having its upper and lower portions passed around said loose pulleys respectively in the same direction, thereby to drive said two loose pulleys in opposite directions, substantially as described.

5. In a power-reversing mechanism for a shaft, two pulleys loosely mounted thereon in close proximity to each other, and clutch mechanism for alternate engagement thereof with said shaft, combined with an idler-carrier, an idler journaled therein, said carrier being mounted to rotate and move longitudinally in a transversely-pivoted clamp therefor, whereby said carrier may be adjusted radially about the axis of said shank by reason of the rotation thereof and toward said clamp by reason of the longitudinal movement of said carrier and around said clamp as a center by reason of the pivotal arrangement thereof, and a single belt passed around said idler and having its upper and lower portions passed around said loose pulleys respectively in the same direction, substantially as described.

6. In a power-reversing mechanism, a shaft, two pulleys loosely mounted side by side on the said shaft close to each other, combined with clutch mechanism on the shaft at the outer sides of each of said two pulleys to alternately engage said respective pulleys with the shaft, a second shaft substantially parallel to said first-mentioned shaft, a pulley thereon, an idler adjacent said two contiguous pulleys, and a belt passed around the three pulleys and the idler to drive said two contiguous pulleys in opposite directions, substantially as described.

In testimony whereof I have signed my name to this specification in the presence of two subscribing witnesses.

JOHN E. WINDLE.

Witnesses:
   GEO. W. GREGORY,
   M. J. SHERIDAN.